March 6, 1956  J. R. BAUMGARTNER  2,737,056
BACKLASH ELIMINATOR
Filed Sept. 14, 1953
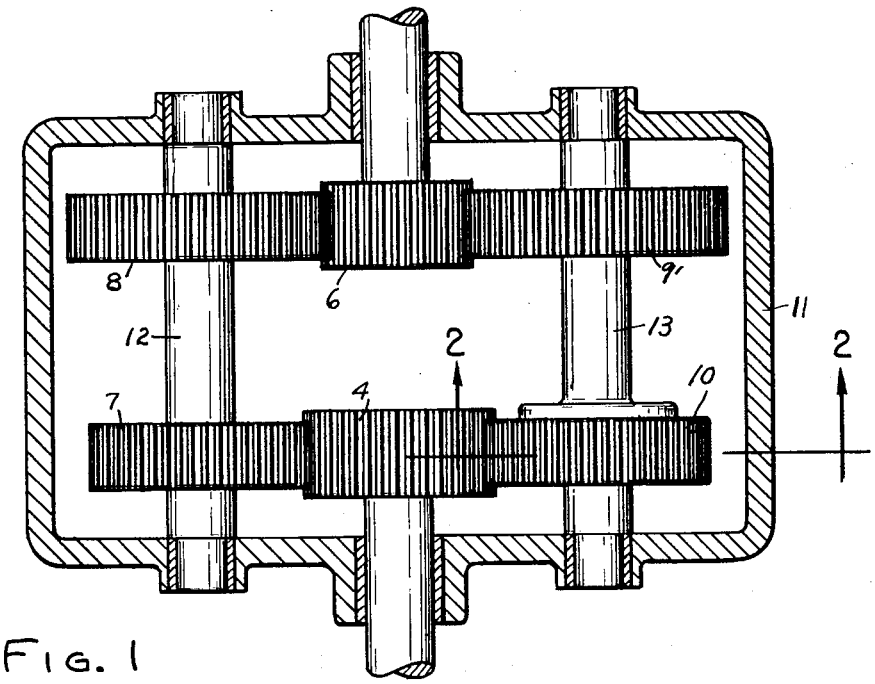
FIG. 1
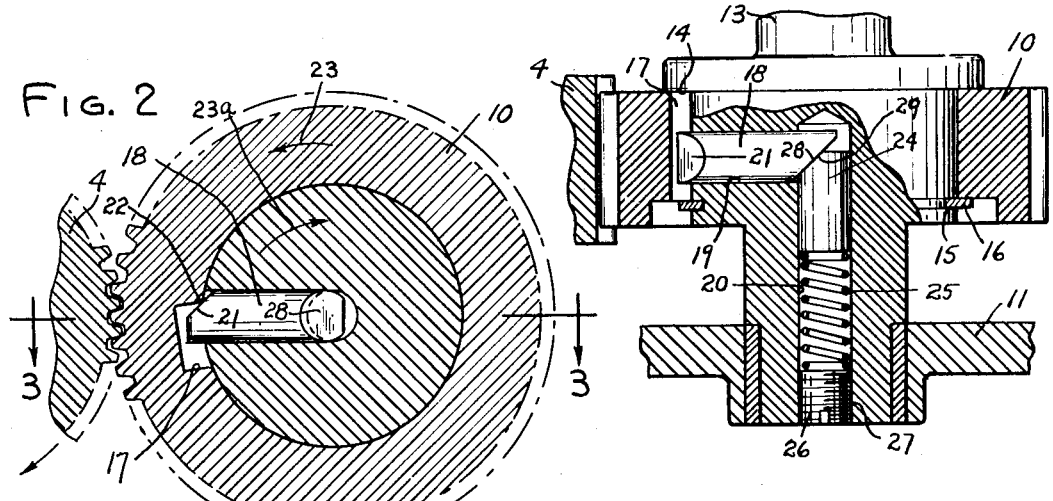
FIG. 2
FIG. 3
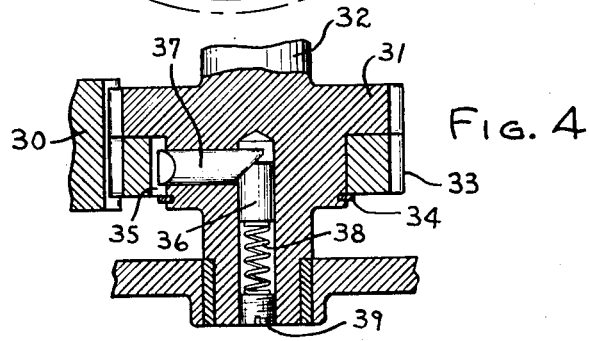
FIG. 4
INVENTOR.
John R. Baumgartner
BY Quarles & French
Attys.

United States Patent Office 2,737,056
Patented Mar. 6, 1956

2,737,056

BACKLASH ELIMINATOR

John R. Baumgartner, Milwaukee, Wis.

Application September 14, 1953, Serial No. 379,771

2 Claims. (Cl. 74—409)

The invention relates to gearing and more particularly to a backlash eliminator for gearing.

The main object of the invention is to provide in a gear train a gear capable of angular movement relative to the other gears associated with it, which gear is adapted to be moved angularly relative to its support and its associated meshing gear to bring it into close mesh with its associated gear and produce a counter torque in the other gears with which it is associated so as to eliminate backlash or play between the gears of the gear train. More particularly, the angular advanceable gear is keyed to its support by an automatically adjustable wedge key connection therewith, the key being subjected to an adjustable predetermined loading under the control of the operator and readily accessible to him from one side of the gearing.

The invention further consists in the several features hereinafter set forth and more particularly defined by claims at the conclusion hereof.

In the drawings:

Fig. 1 is a sectional view through a gear box having gearing provided with the backlash eliminator embodying the invention;

Fig. 2 is a detailed vertical sectional view taken on the line 2—2 of Fig. 1;

Fig. 3 is a detailed vertical sectional view taken on the line 3—3 of Fig. 2;

Fig. 4 shows certain modifications, parts being broken away and parts being shown in section.

Referring to Fig. 1 of the drawings, I have shown as an example of a gear train in which the invention may be used, a gearing including a drive gear 4, a driven gear 6 of a different diameter than the gear 4, and intermediate gears 7, 8, 9, and 10, these gears having their shafts suitably journalled in a gear box 11. The gears 7 and 8 are direct connected to their shaft 12. The gear 9 is direct connected to its shaft 13 while the gear 10 is mounted to float on the shaft 13.

As shown in Fig. 3, the shaft 13 has an annular shoulder 14 against which one side of the gear 10 abuts and is provided with an annular groove 15 in which a retainer ring 16 abutting the other side of the gear 10 is mounted so that the gear 10 can move angularly relative to the shaft 13.

The gear 10 has a keyway 17 formed therein and is keyed to the shaft 13 by a key 18 mounted in a lateral bore 19 in the shaft 13 which intersects an axially disposed bore 20 in said shaft.

The key 18 has a wedge face 21 adapted to engage one corner 22 of the keyway 17 so that pressure applied lengthwise of said key will tend to angularly advance or rotate the gear 10 in the direction of its rotation as indicated by the arrow 23 and in doing so create a torque in the opposite direction in the gears support 13 as indicated by the arrow 23a. For applying a predetermined pressure to the key 18, a plug or pin 24 is slidably mounted in the bore 20 and operatively connected to the key 18 and loaded by a spring 25 interposed between said pin and an adjustable plug or sleeve nut 26 which is in threaded engagement with the outer threaded end 27 of the bore 20 so that the nut 26 is readily accessible to the operator.

The operative connection between the key 18 and the pin 24 is here shown as a tapered or forty-five degree angled face 28 on the inner end of the key 18 engaging a similar angled face 29 on the outer end of the pin 24.

It is well known that even though gears may be carefully machined and finished, when such gears are assembled together, there is always some play between the gears, and for efficient operation this play or backlash should be taken up.

In the above described construction any play between the gears of the gear train is taken up by the fact that the wedge connection between the gear 10 and its key 18 acts to impart an angular thrust to the gear 10 in the same direction as its rotation which acts to hold its teeth in contact with the teeth of the drive gear 4 and also produces a torque in the opposite direction upon the shaft 13 and the other gears to take up play between these gears. If for any reason the force exerted on the gear 10 by the gear 4 should become excessive, then the key 18 can release itself from the gear 10 since it can move inwardly against the pin 24 which can move relative to the shaft 13 because of the spring 25.

The gear 10 can be rotated in either direction, but if it is rotated in the opposite direction from that shown by the arrow 23, there will be more of a tendency to move the key 18 inwardly. The key 18 during the rotation of the gearing is free to move in and out relative to its support to automatically take up the play between its associated gears.

The invention may also be used in connection with simple gearing such as shown in Fig. 4 in which the drive gear 30 meshes with a gear 31 fixed on a driven shaft 32, and the gear 33 is a floating gear similar to the gear 10 and mounted for angular movement relative to the gear 31 on its shaft 32 between said gear 31 and a collar 34 on the shaft 32 and having a wedge key connection with the hub of the gear 31 or its shaft comprising the keyway 35, wedge key 36, pin 37, spring 38, nut 39, which parts are similar to the parts 17, 18, 24, 25, and 26 previously described.

In this modified construction the floating gear 33 through its wedge connection with the key 36 mounted in either the hub of the gear 31 or its shaft 32 acts to produce a counter torque in the gear 31 which acts to take up any play between this gear and the drive gear 30.

It will be noted that while the invention has been shown as applied to ordinary straight toothed gearing, it can be used for spiral and other forms of gear teeth.

I desire it to be understood that this invention is not to be limited to any particular form or arrangement of parts except insofar as such limitations are included in the claims.

What I claim as my invention is:

1. In gear including a drive gear and a driven gear, the combination of a rotatable support, a gear meshing with one of said gears and mounted for angular movement relative to said support, a movable wedge key connection between said angularly movable gear and its support, and means comprising a spring and a nut adjustably mounted in an exposed end of said support for yieldingly loading said wedge key connection, said wedge key connection setting up a counter torque in the train of the above mentioned gears to take up play in the gearing.

2. In gearing having a drive gear, a driven gear and intermediate gears operatively connecting said drive and driven gears, supports for said intermediate gears, one of said intermediate gears being capable of angular movement relative to its support and provided with a keyway, a key slidably mounted in said support and having a wedge face engageable with said keyway, a pin slidably mounted in said support and operatively connected to said key, and an adjustably tensioned spring bearing on said pin to move it and said key to exert a pressure through said wedge face on said gear tending to angularly advance said gear in the direction of its rotation and create a counter torque to take up backlash between said gear and its associated gears.

References Cited in the file of this patent

UNITED STATES PATENTS

| | | |
|---|---|---|
| 2,061,684 | Spence, Jr. | Nov. 24, 1936 |
| 2,459,092 | Peterson | Jan. 11, 1949 |